(12) United States Patent
Tracht

(10) Patent No.: US 8,662,531 B2
(45) Date of Patent: Mar. 4, 2014

(54) VEHICLE SEAT ASSEMBLY WITH INBOARD SIDE AIR BAG

(71) Applicant: Lear Corporation, Southfield, MI (US)

(72) Inventor: Michael Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/663,693

(22) Filed: Oct. 30, 2012

(65) Prior Publication Data

US 2013/0119646 A1    May 16, 2013

(30) Foreign Application Priority Data

Nov. 16, 2011  (DE) .................... 10 2011 086 471

(51) Int. Cl.
*B60R 21/16* (2006.01)
(52) U.S. Cl.
USPC ........................................... 280/730.2
(58) Field of Classification Search
USPC ........................................... 280/730.2
See application file for complete search history.

(56) References Cited

U.S. PATENT DOCUMENTS

| | | | |
|---|---|---|---|
| 5,752,714 A | 5/1998 | Pripps et al. | |
| 5,762,363 A * | 6/1998 | Brown et al. | 280/730.2 |
| 5,810,389 A | 9/1998 | Yamaji et al. | |
| 5,860,673 A | 1/1999 | Hasegawa et al. | |
| 5,927,749 A * | 7/1999 | Homier et al. | 280/730.2 |
| 5,997,032 A | 12/1999 | Miwa et al. | |
| 6,045,151 A | 4/2000 | Wu | |
| 7,290,791 B2 * | 11/2007 | Tracht | 280/730.2 |
| 7,311,325 B2 * | 12/2007 | Tracht et al. | 280/730.2 |
| 7,322,597 B2 * | 1/2008 | Tracht | 280/728.3 |
| 7,677,594 B2 * | 3/2010 | Hazlewood et al. | 280/728.2 |
| 2005/0145597 A1 | 7/2005 | Kull et al. | |

FOREIGN PATENT DOCUMENTS

| | | |
|---|---|---|
| DE | 102005057504 A1 | 6/2006 |
| DE | 102008053078 A1 | 4/2010 |
| DE | 102008053080 A1 | 4/2010 |
| EP | 2186671 A1 | 5/2010 |

OTHER PUBLICATIONS

German Office Action Dated Aug. 6, 2012, Applicant Lear Corporation, Application No. 10 2011 086 471.7, 12 Pages.

* cited by examiner

*Primary Examiner* — Faye M. Fleming
(74) *Attorney, Agent, or Firm* — Brooks Kushman P.C.

(57) ABSTRACT

In at least certain embodiments, the vehicle seat assembly comprises a frame having a support portion, a seat pad, a trim cover extending over the seat pad, and an air bag assembly. In accordance with this embodiment, the air bag assembly includes an inflator and an air bag, and the air bag assembly is mounted on the support portion of the frame such that the air bag assembly is disposed inboard of the support portion of the frame.

16 Claims, 5 Drawing Sheets

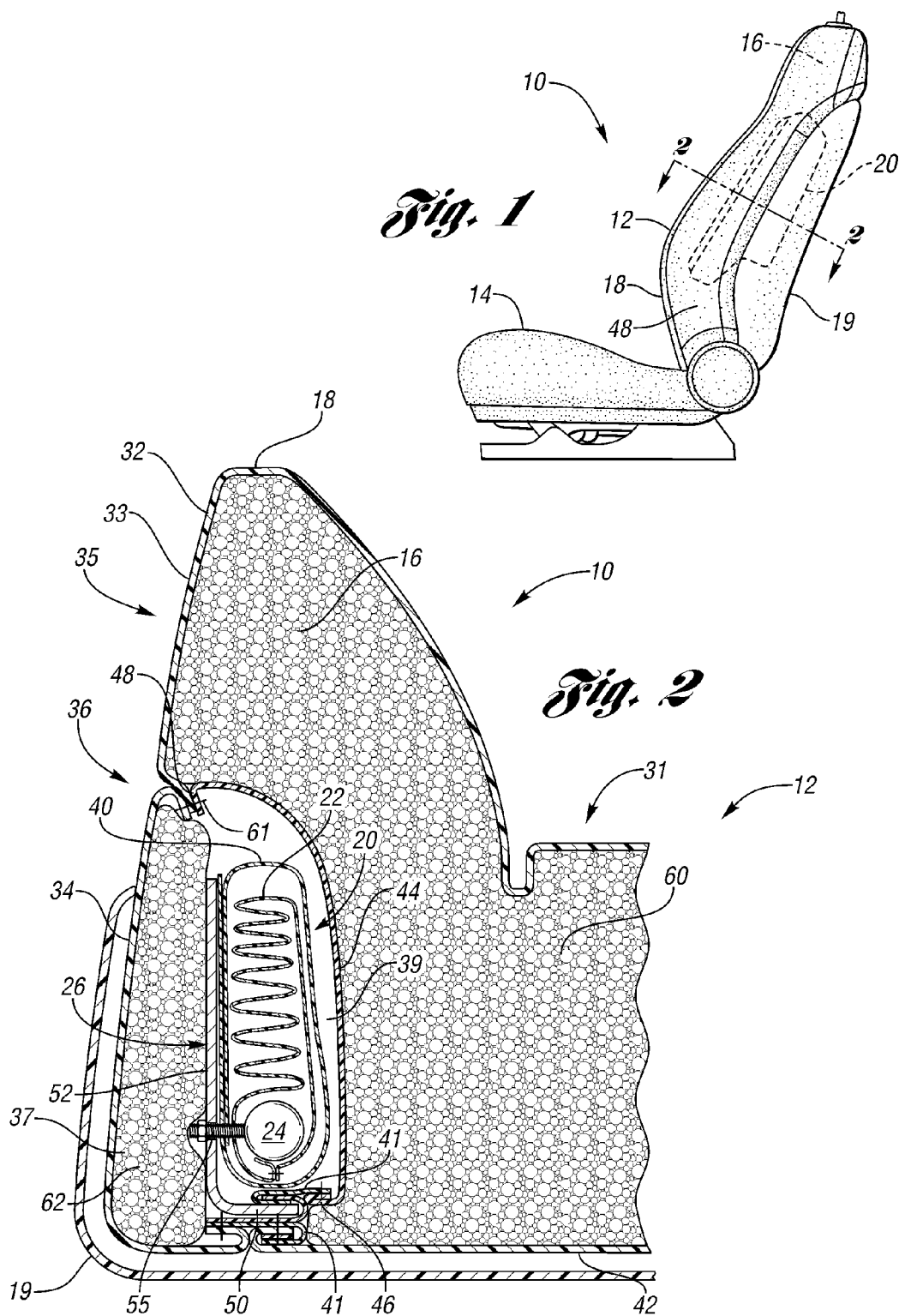

VEHICLE SEAT ASSEMBLY WITH INBOARD SIDE AIR BAG

CROSS-REFERENCE TO RELATED APPLICATIONS

This application claims foreign priority benefits under 35 U.S.C. §119(a)-(d) to DE 10 2011 086 471.7, filed Nov. 16, 2011, the disclosure of which is hereby incorporated by reference in its entirety.

TECHNICAL FIELD

The present invention relates to a vehicle seat assembly, and in particular, a seat assembly including an air bag.

BACKGROUND

Vehicles can be equipped with side air bags, which may be in the form of an air bag disposed within a vehicle seat assembly. One limitation of air bags that are located within a seat assembly, is that the air bag needs to break through the seating material before it can fully deploy to protect a vehicle occupant. During deployment, such an air bag may encounter foam, or other seat pad materials, and must then break through a seat trim cover in order to escape from the seat assembly. Another limitation is that the air bag should break through the cover material at a predetermined location to optimize effectiveness. Other limitations are that the incorporation of the air bag in the seat assembly should not cause discomfort or safety issues to occupants.

Prior vehicle seat assemblies equipped with side air bags and manufacturing methods are disclosed in U.S. Pat. Nos. 5,860,673, 5,997,032 and 6,045,151, for example.

SUMMARY

Under the invention, a vehicle seat assembly is provided. In at least one embodiment, the vehicle seat assembly comprises a frame having a support portion, a seat pad adjacent the frame and having a main body portion for supporting an occupant, a trim cover extending over at least a part of the seat pad and having a release seam adjacent the seat pad, and an air bag assembly mounted on the support portion of the frame within the trim cover in a spaced relationship from the release seam. In accordance with this embodiment, the air bag assembly includes an inflator and a folded air bag that is inflatable by the inflator to unfold and project outwardly from the seat assembly through the air bag release seam of the trim cover. Further in accordance with this embodiment, the air bag assembly is disposed between the support portion of the frame and the main body portion of the seat pad such that the air bag assembly is disposed inboard of the support portion of the frame. Still further in accordance with this embodiment, the vehicle seat assembly may include an air bag guide panel including a guide having a first end adjacent the air bag assembly and a second end adjacent the release seam.

In at least one embodiment, the guide panel is disposed between the main body portion of the seat pad and the support portion of the frame.

In yet another embodiment, the trim cover comprises a front trim panel and a side trim panel connected to each other to form the release seam, with the second end of the panel being connected to the tear seam.

In at least another embodiment, the seat pad further comprises a minor body portion, smaller than the main body portion of the seat pad, disposed between the side trim panel and the support portion of the frame.

In yet at least another embodiment, the vehicle seat assembly comprises a frame, a seat pad adjacent the frame, and a trim cover extending over at least a part of the seat pad. In this embodiment, the seat assembly further comprises an air bag assembly mounted on the frame, with the air bag assembly including an inflator and a folded air bag that is inflatable by the inflator to unfold and project outwardly from the seat assembly. In this embodiment, the air bag assembly is disposed between the frame and the seat pad such that the frame extends along the air bag assembly outboard of the air bag assembly. In this embodiment, the seat assembly may also further comprises an air bag guide including a flexible panel disposed between the seat pad and the frame.

In still yet at least another embodiment, a method of making a vehicle seat assembly is provided. In this embodiment, the method comprises providing a frame having a forwardly extending support portion, mounting a seat pad on the support portion of the frame such that an air bag assembly space of 150 to 3,500 cm$^3$ is disposed between the support portion of the frame and the seat pad, and disposing a trim cover over at least a portion of the seat pad and the frame. In this embodiment, the method further comprises securing an air bag assembly adjacent the support portion of the frame in the vehicle seat assembly such that the support portion of the frame is outboard of the air bag assembly, with the air bag assembly including an air bag that is inflatable, and providing an air bag guide including a panel of sheet material and associating the air bag guide with the air bag assembly so that the panel extends between the seat pad and the air bag assembly.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a fragmentary side view of a portion of a seat assembly in accordance with an embodiment of the present disclosure;

FIG. 2 is a fragmentary cross-sectional view of a portion of a seat assembly shown in FIG. 1 taken along FIG. 2-2;

DETAILED DESCRIPTION

Figure 3:
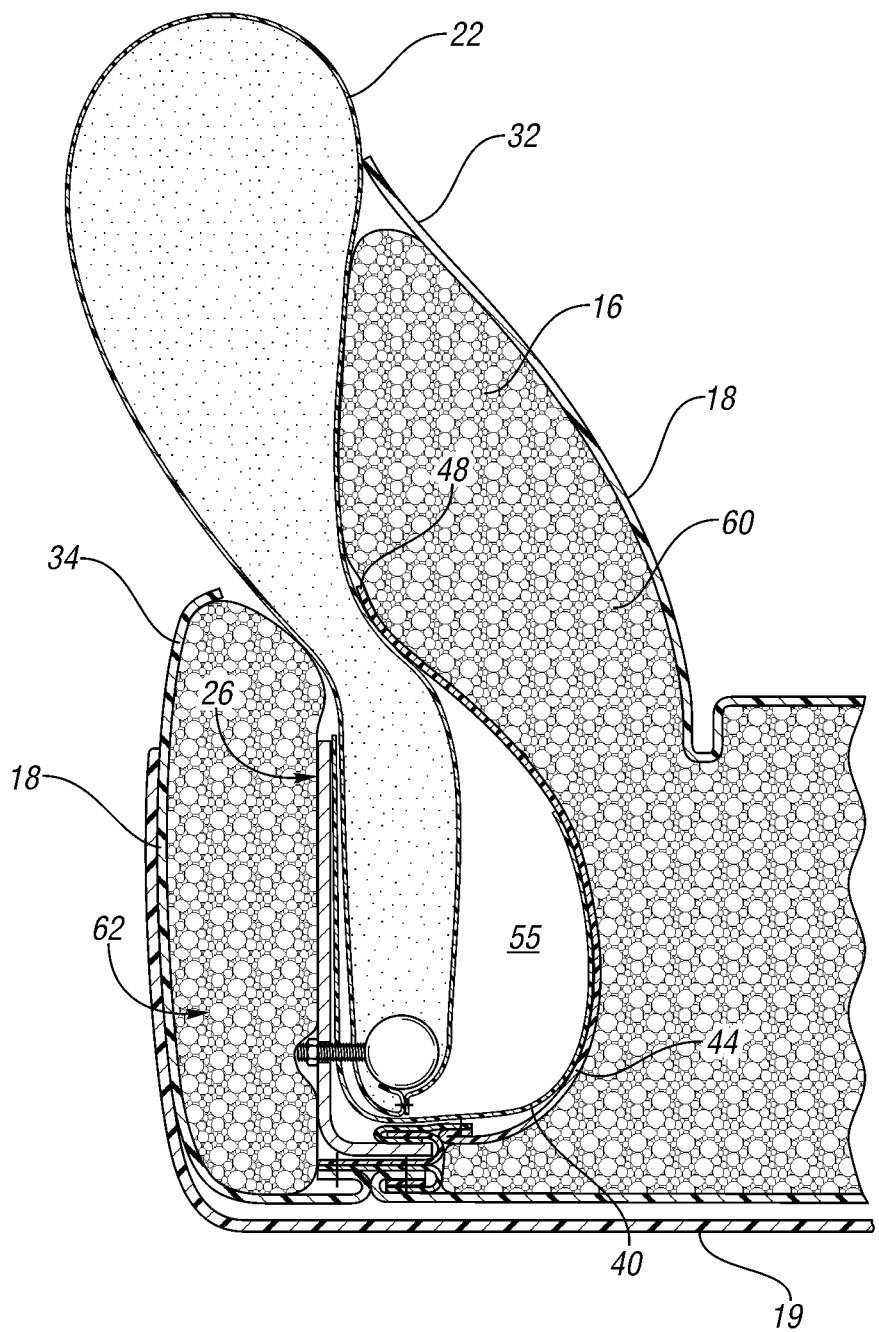
FIG. 3 is a view similar to FIG. 2 showing the air bag inflated.

As required, detailed embodiments of the present invention are disclosed herein. However, it is to be understood that the disclosed embodiments are merely exemplary of the invention that may be embodied in various alternative forms. The figures are not necessarily of scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts of materials or conditions of reactions and/or use are to be understood as modified by the word "about" in describing the broader scope of this invention. Practice within the numerical limits stated is generally preferred. Also, unless expressly stated to the contrary, the description of a group or class of materials as suitable preferred for a given purpose in connection with the invention implies that mixtures of any two or more members of the group or class may be equally suitable or preferred.

The present disclosure describes various vehicle seat configurations that include an inflatable air bag assembly. Several specific embodiments are set forth in the following description and in the Figures to provide a thorough understanding of certain embodiments according to the present disclosure. As those of ordinary skill in the art will understand, one or more features of an embodiment illustrated and described with reference to any one of the Figures may be combined with features illustrated in one or more other Figures to produce embodiments that are not explicitly illustrated or described. In addition, other embodiments may be practiced without one or more of the specific features explained in the following description.

FIG. 1 shows an exemplary vehicle seat assembly 10 according to the present disclosure for use in a motor vehicle. The illustrated seat assembly 10 includes a seat back 12 and a seat bottom cushion 14 attached to the seat back. The seat back 12 includes a seat pad 16 covered by a trim cover 18. The trim cover 18 may be made of any suitable material such as cloth, vinyl or leather, etc. As is shown in FIG. 1, in at least some embodiments, a relatively rigid plastic molding 19 can optionally be provided in the rear area of the seat assembly 10 to provide support and/or for aesthetics.

In at least one embodiment, the seat pad 16 is made from a molded polymeric material, such as a polyurethane foam as is shown in FIG. 2. The use of a polymeric foam material to construct the seat pad 16 can be cost effective and can provide the flexibility needed to easily change the shape of the seat pad for different types of seat assemblies. Of course, other types of polymeric materials may be molded to form the seat pad 16.

Disposed within the seat back 12 is an air bag assembly, such as a side air bag assembly 20. While the side air bag assembly 20 is shown on the seat back 12, which is a usage for which it has particular utility, it is also possible for the side air bag assembly to be utilized with a seat bottom even though the seat back usage is specifically disclosed. Also, as illustrated, the air bag assembly 20 is located at an outboard lateral side or extremity of the seat to provide protection against adjacent vehicle structure, but it is also possible to have the side air bag assembly located at the inboard lateral side to provide protection against an adjacent vehicle occupant and to also have side air bag assemblies at both outboard and inboard locations for protection in both lateral directions.

As shown in FIG. 2, the air bag assembly 20 includes an air bag 22 and an inflator 24, which is configured to supply inflation fluid such as gas to the air bag 22, thereby facilitating deployment of the air bag 22. In at least the illustrated embodiment, the air bag assembly 20 also includes an optional housing 40 which at least partially surrounds the air bag 22 and the inflator 24. In the illustrated embodiment, the housing 40 is a soft cover, however those of ordinary skill in the art would appreciate that other types of covers, such as a hard cover, could be used.

Also shown in FIG. 2 is a portion of a seat frame 26 which can be used for mounting the seat assembly 10 to a vehicle. The seat pad 16 is disposed inboard of the support portion of the frame 26 and the air bag assembly 20 and may be directly attached to the frame 26 at various points. The seat frame 26 can be made of any suitable material, such as metal, plastic, rigid foam, or a composite such as carbon fiber disposed in a resin matrix.

In at least the illustrated embodiment, the trim cover 18 includes a first or a generally front panel 32 and a second or a generally side panel 34 that cooperate to form an air bag release seam 36 which in at least one embodiment is adjacent to a side of the seat pad 16. It should be understood that the location of the release seam 36 can vary as desired. As best shown in FIG. 2, the front panel 32 of the trim cover 18 extends over the front side 31 of the seat back 12 and over a front portion 33 of the side portion 35 of the seat back 12. The side panel 34 extends over a rear portion 37 of the side portion 35 of the seat back 12. The trim cover 18 also includes a rear panel 42 extending over the rear side of the seat back 12. In at least one embodiment, the release seam 28 is 40 to 70 cm in length, but can be any suitable length.

Referring again to FIG. 2, in the illustrated embodiment, the air bag assembly 20 is located within the trim cover 18 and is mounted on the frame 26 adjacent the air bag release seam 28 in a spaced relationship from the release seam. The schematically illustrated folded air bag 22, upon deployment, is inflated by inflation fluid from the inflator 24 to unfold and project outwardly from the seat 10 through the air bag release seam 28 of the trim cover 18 (FIG. 3).

As can be best seem in FIG. 2, the seat frame 26 has a rear portion 50 extending along the rear side of the seat back, and a side portion 52 extending from the rear portion 50 alongside the side portion 35 of the seat back 12 towards the release seam 36. In the illustrated embodiment, the air bag module 20 is mounted to the side portion 52 of the seat frame 26 via any suitable manner, such as by the bolt 55 shown in the illustrated embodiment. The air bag module 20 is mounted in such as manner so that the air bag module 20 is disposed between the main body portion 60 of the seat pad 16 and the side portion 52 of the seat frame 26. With such an arrangement, potential incidences of the frame 26 impacting the occupant during deployment can be less likely as the frame 26 is urged away from the occupant during air bag deployment. The main body portion 60 of the seat pad 16 supports the back of the occupant when seated in the seat back 12. In at least the illustrated embodiment, there is an optional minor body of foam 62, smaller than main body portion 60, disposed between the side portion 52 of the seat frame 26 and the side panel 34 of the trim cover 18. While illustrated in FIG. 2 as being separated from the main body portion 60 of the seat pad 16, it should be understood that the minor body portion 62 could be attached to the major body portion 60.

With continuing reference to FIG. 2, an air bag guide of the seat back component generally indicated by 44 is associated with the seat assembly 10. In at least one embodiment, the air bag guide 44 is a panel 44 made of any suitable sheet material effective to protect the seat pad 16 during deployment of the air bag 22. For example, the panel 44 can be made of a woven or non-woven cloth material, which may include natural or synthetic materials such as nylon. One material that is found to be effective is a polyamide material, of the type from which the air bag 22 may be manufactured. The sheet material may be flexible or elastic. The guide 44 could also be made of plastic or other suitable material. Regardless of the type of material used to make the air bag guide 44, the use of the air bag guide 44 can be helpful in reducing friction on the air bag 22 as it deploys. Although a polymer such as nylon may be particularly beneficial, even a fleece material will help reduce the friction on the air bag 22. This is because the air bag guide 44 inhibits contact between the deploying air bag 22 and the seat pad 16 and helps to prevent small particles from separating from the seat pad and being introduced into the vehicle compartment.

While shown in FIG. 2 to comprise one panel 44, in other embodiments the air bag guide 44 can comprise two or more panels, such as where one panel is on one side of the air bag assembly 20 and the other panel is on the other side. Furthermore, guide 44 could comprise one panel that wraps around module 20. As should be readily understood, distal ends of the panels could be attached to the release seam 36, but do not need to be. While shown in FIG. 2, it should be understood that guide 44 could be optional, and thus not present in seat assembly 10.

The air bag guide 44 can be associated with the air bag assembly in any suitable manner. For instance, in at least one embodiment, the panel 44 of the air bag guide 44 includes a rear end 46 that can be attached suitably to the trim cover 18 via J-hooks 41 to effectively associate the air bag guide 44 with the air bag assembly 20. As best shown in FIG. 2, in this illustrated embodiment, the rear end 46 is attached to the trim cover 18 behind the air bag assembly 20. Alternatively, the rear end 46 of the air bag guide 44 could be associated with the air bag assembly 20 via another manner, such as by attachment to the side portion 52 of the frame 26.

Figure 5:
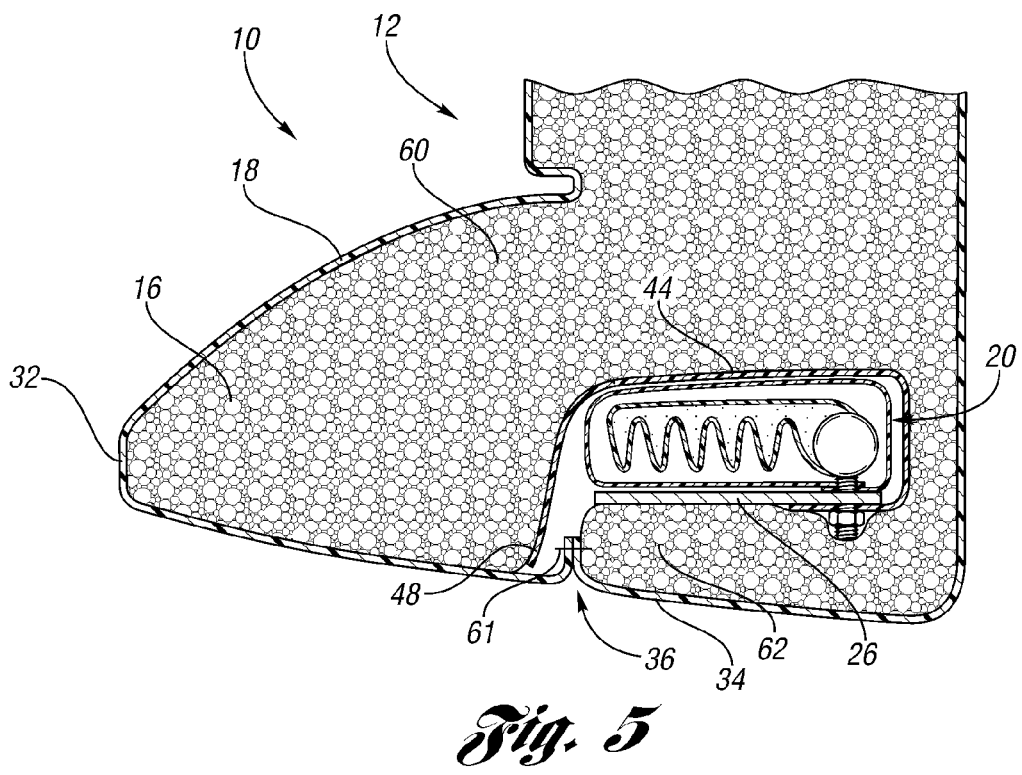
FIG. 5 is a view similar to FIG. 4 showing another embodiment.

In the embodiment illustrated in FIG. 2, the panel 44 of the air bag guide includes a front end 48 attached to the trim cover 18 adjacent the release seam 36 so that the front panel 32 of the trim cover is disposed between front end 48 of guide 44 and side panel 34 of trim cover with all three ends stitched together via thread 61 and facing in the same direction. The front end 48 of guide 44 and front and side panels 32, 34 can be attached by any suitable manner. For instance, they can be attached via stitching 61, ultrasonic welding, adhesive, etc., among other suitable manners. Furthermore, the ends of the guide 44 and the panels 32 and 34 can be oriented in any suitable configuration, including the end 48 of the guide 44 being detached from the panels 32 and 34, as shown in FIG. 5.

As shown in the embodiment illustrated in FIG. 2, stitching 61 can be used to connect the front end of panel 48 and the front and side panels 32 and 34 together. The stitching 61 can be applied in any suitable manner.

In at least one embodiment, the air bag guide 44 is effective to inhibit contact between the deploying air bag 22 and the seat pad 16. This can help to prevent energy loss from the air bag 22 by decreasing friction and protecting the seat pad 16 from damage. This, in turn, can also help to reduce the deployment time for the air bag 22 and/or the amount of inflation fluid required to deploy the air bag.

In at least the embodiment illustrated in FIG. 2, disposed between the side portion 52 of frame 26 and air bag guide 44 is a space 39 for accommodating the undeployed air bag assembly 20. This space 39 can be any suitable size, but in at least one embodiment is 2.5 to 7.5 cm in width, 6 to 20 cm in depth, and 10 to 50 cm in height. Furthermore, in at least one embodiment, the space 34 has a volume of 150 to 3,500 cm$^3$, and in at least another embodiment of 200 to 2,000 cm$^3$. An advantage of such an arrangement is that incidences of the frame 26 accidently impacting the occupant during air bag deployment are less likely as the frame 26 tends to be urged away from the occupant during deployment.

In at least one embodiment, the side portion 52 of the frame 26 and the air bag guide 44 form a deployment channel 55 for the air bag 22. As best shown in FIG. 3, the deployment channel 55 is oriented to facilitate deployment of the air bag 22 through the seam 36 in the trim cover 18. In the illustrated embodiment, the panel 44 aids in tearing the release seam 36 by directing the deployment force of the air bag 22 to the release seam 36. In certain embodiments, the trim cover 18 can be made of a material that is more stretchable than the panels 44.

Upon deployment of the air bag assembly 20, as shown schematically in FIG. 3, the deploying air bag 22 causes relative movement of the air bag guide panel 44 and the front and side panels 32 and 34 of the trim cover 18 away from each other as the unfolding air bag 22 moves between the guide panel 44 and the side portion 52 of the frame 26 toward the air bag release seam 36 and eventually tears open the release seam for outward projection of the air bag to provide the occupant protection. Furthermore, as the air bag 22 deploys through the deployment channel 55, the air bag guide 44 acts as a blocking member that forms a barrier between the seat pad 16 and the air bag 22, thereby inhibiting contact between the air bag 22 and the seat pad 16.

As shown in FIG. 3, the attachment of the front end 48 of the air bag guide 44 to the seam 36 helps to facilitate deployment of the air bag 22 through the seam 36. This is because the deployment channel 55 opens as the air bag 22 is deployed, and this causes the release seam 36 to rupture directing the deploying air bag 22 to exert an outward force on the trim cover 18 at the seam 36; this helps to open the seam 36 to provide an easy exit for the air bag 22. Also attachment of the air bag guide panel 44 to the release seam 36 can help to ensure that the air bag 22 will deploy in the predetermined desired manner through the seam 36. Because the panels 32, 34 and 44 are connected to each other with the same connection or stitching 61, relatively consistent deployment of air bag in seat assemblies 10 employing the air bag guide 44 can occur.

While the embodiment illustrated in FIGS. 2-3 shows an arrangement where the air bag 22 deploys between main body portion 60 of foam 16 and optional foam 62, it should be understood that other configurations and deployment schemes could be contemplated. For instance, main body portion 60 could have a break to allow the air bag 22 to deploy between two pieces of main body portion 60 towards the inboard, or more forward portion, of seat assembly 10. Furthermore, an arrangement could be configured where air bag 22 deploys between main body portion 60 and side panel 32 of the trim cover. In these scenarios, tear seam 36 would also be located more forward or inboard relative to the embodiment depicted in FIGS. 2-3.

Figure 4:
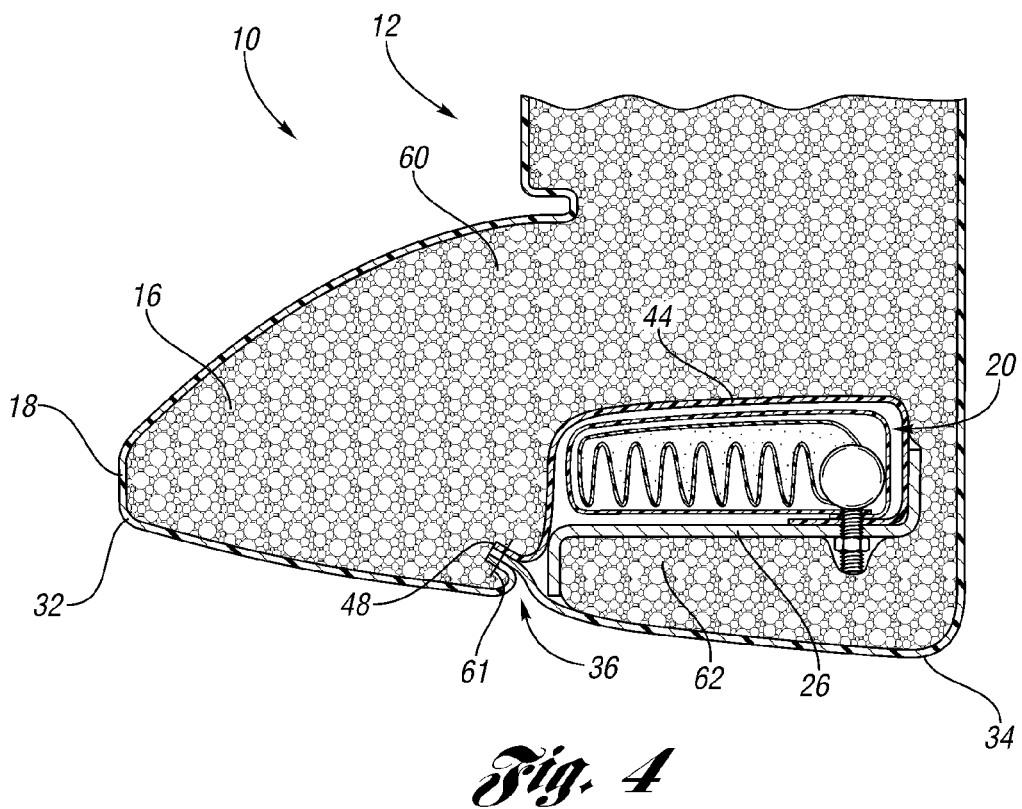
FIG. 4 is a view similar to FIG. 2 showing another embodiment.

FIG. 4 illustrates another embodiment of an arrangement of trim panels 32, 34 of trim cover 18 and air bag guide 44. This configuration is similar in construction, manufacture, and operation to the embodiment shown in FIGS. 2-3. In this embodiment, the front end 48 of the air bag guide 44, and the ends of the panels 32 and 34 all face in the same direction towards the front of the seat assembly 10 and in this embodiment the end portion of 34 is disposed between end portion of 36 and end portion 48. This arrangement enables the use of trim cover 32 to be made of a relatively low tensile strength material relative to trim panel 34.

FIG. 5 illustrates another embodiment of an arrangement of trim panels 32, 34 of trim cover 18 and air bag guide 44. This configuration is similar in construction, manufacture, and operation to the embodiment shown in FIGS. 2-3. In this embodiment, the front end 48 of the air bag guide 44 is spaced from and detached from the ends of the panels 32 and 34. This arrangement enable the trim cover 18 to be applied after the air bag module 20 and the seat pad 16 are mounted since the guide 44 is not sewn to the trim cover 18.

Figure 6:
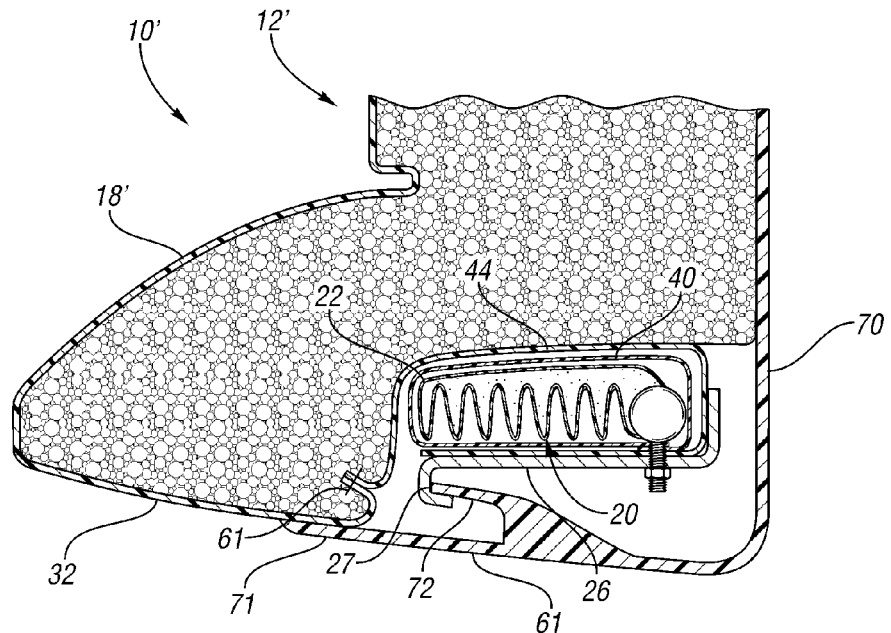
FIG. 6 is a view similar to FIG. 5 showing another embodiment.
Figure 7:
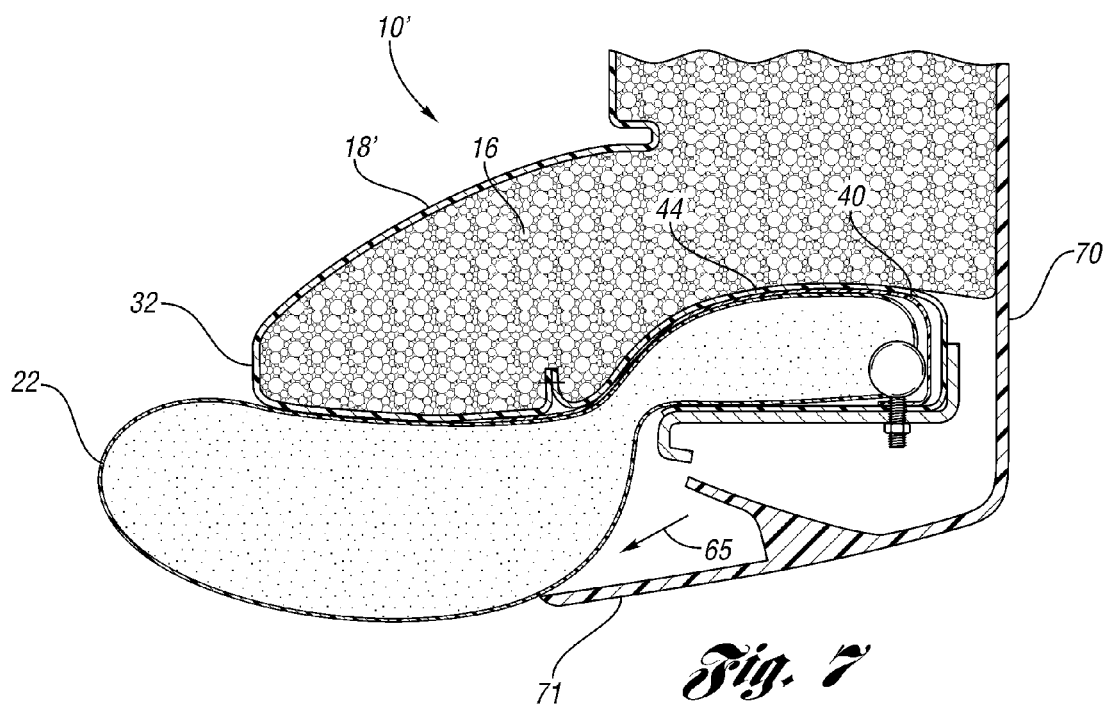
FIG. 7 is a view similar to FIG. 6 showing the air bag inflated.

Referring to FIG. 6, an alternate embodiment of seat assembly 10' is illustrated. This embodiment may function in a similar manner as discussed above in detail. In this embodiment, air bag 22 of the air bag module 20 deploys between back panel 70 and trim cover 32 of the seat back 12' of seat assembly 10', as shown schematically in FIG. 7. More specifically, air bag 22 deploys in a forward deployment direction between a front portion 71 of back panel 70 and an outboard side 35 of the trim panel 32 of the trim cover 18', as indicated by deployment direction arrow 65. In this embodiment, air bag guide 44 and end of front panel 32 are secured to each other via stitching 61. Back panel 70 has an optional tab 72 extending inwardly towards the front of the air bag assembly 10'. Frame 26 has a hook portion 27 that attaches onto tab portion 72.

Upon inflation of the air bag 22, the front portion 71 of the back panel 70 is deflected by the deploying air bag 22 so that the air bag extends between front portion 71 of back panel 70 and air bag guide 44 and trim panel 32. Thus, a release seam in the trim cover 18' is not necessary. In at least the illustrated embodiment, tab portion 72 and hook portion 27 separate upon deployment of air bag 22.

Figure 8:
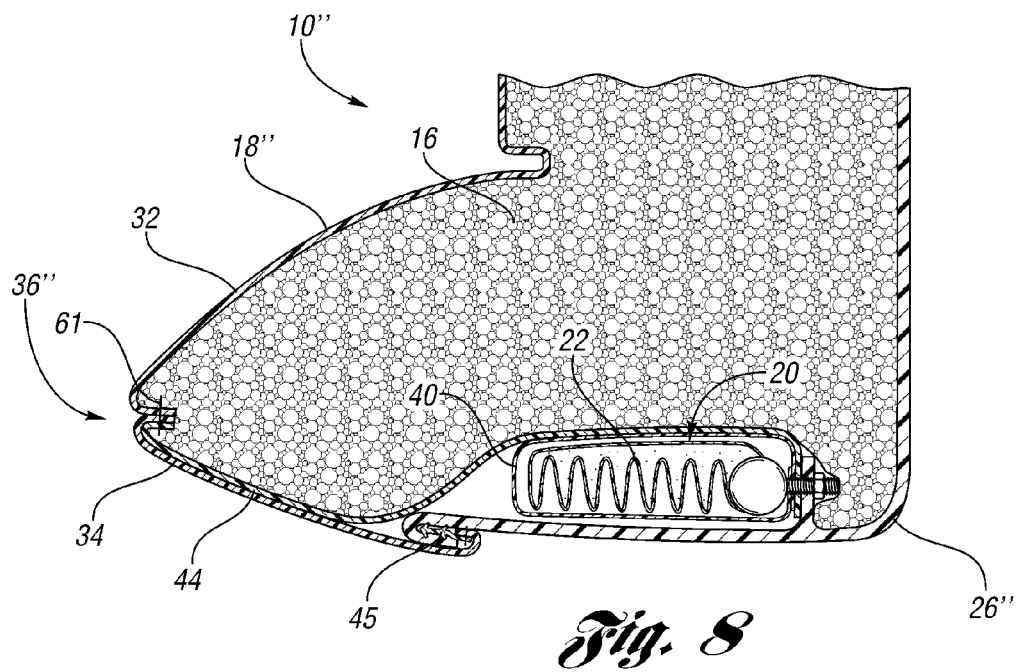
FIG. 8 is a view similar to FIG. 6 showing another embodiment.
Figure 9:
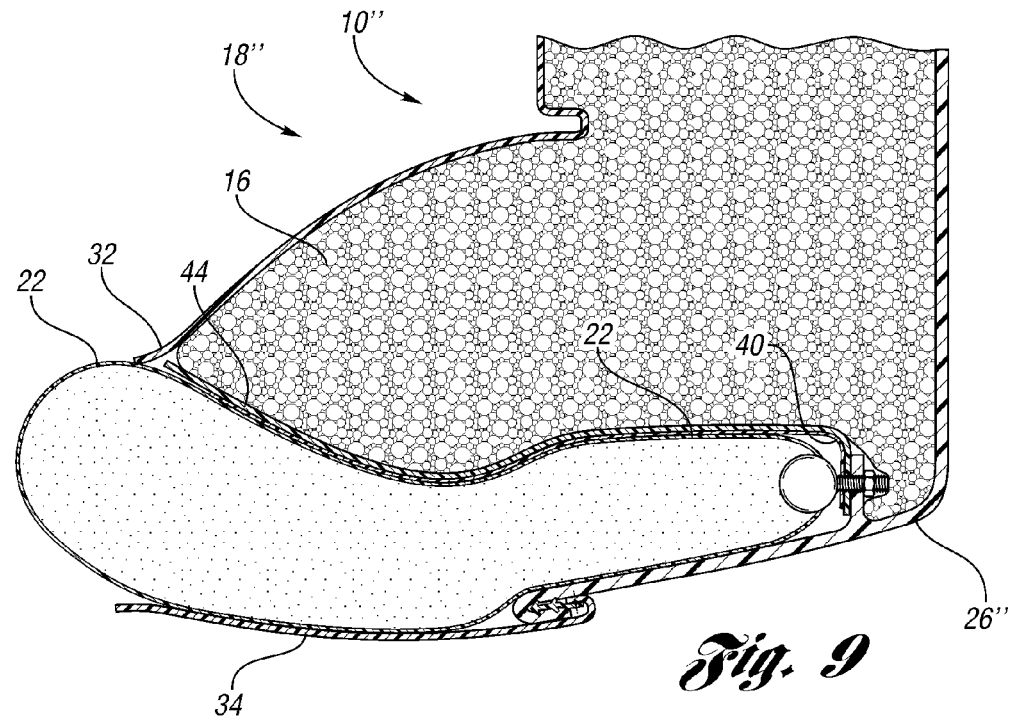
FIG. 9 is a view similar to FIG. 8 showing the air bag inflated.

Referring to FIG. 8, an alternative embodiment of seat assembly 10" is illustrated. This embodiment may function in a similar manner as discussed above in detail. In this embodiment, a bucket-type seat 10" is schematically illustrated. A composite bucket seat shell 26" is provided. The composite shell 26" may be made of any suitable material such as a carbon fiber disposed in a resin matrix. Other suitable materials may be used, including those disclosed above. Air bag assembly 20 is attached in any suitable manner to bucket shell 26", so that bucket shell 26" acts like the frame 26 of the other illustrated embodiments. Bucket shell 26" is any suitable shape and dimension, but in certain embodiments is 0.5 to 7.5 mm thick, and in other embodiments is 1 to 5 mm thick. Trim cover 18" is attached to bucket shell 26" via any suitable manner, such as with use of the schematically illustrated retainer 45. As can be seen in FIG. 9, upon deployment, air bag 22 extends through release seam 36".

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
   a frame having a support portion;
   a seat pad adjacent the frame, the seat pad having a main body portion for supporting an occupant, the main body portion having an outboard surface facing the frame, the frame cooperating with the outboard surface to form an air bag assembly space;
   a trim cover extending over at least a part of the seat pad, the trim cover having a release seam adjacent the seat pad;
   an air bag assembly connected to and mounted on the support portion of the frame in the air bag assembly space and within the trim cover in a spaced relationship from the release seam, the air bag assembly being disposed between the support portion of the frame and the main body portion of the seat pad such that the air bag assembly is disposed inboard of the support portion of the frame, the air bag assembly including an inflator and a folded air bag that is inflatable by the inflator to unfold and project outwardly from the seat assembly through the release seam of the trim cover; and
   an air bag guide including a guide panel made of flexible material, the guide panel having a first end adjacent the air bag assembly and a second end adjacent the release seam, the guide panel being disposed between the outboard surface of the main body portion of the seat ad and the support portion of the frame.

2. The vehicle seat assembly of claim 1, wherein the trim cover comprises a generally front trim panel and a generally side trim panel connected to each other to form the release seam.

3. The vehicle seat assembly of claim 1, wherein the trim cover comprises a front trim panel and a side trim panel connected to each other to form the release seam, the second end of the guide panel being connected to the release seam and the guide panel being disposed between the air bag assembly and the seat pad.

4. The vehicle seat assembly of claim 1, wherein the frame is made of metal.

5. The vehicle seat assembly of claim 2, wherein the seat pad optionally comprises a minor body portion, smaller than the main body portion of the seat pad, disposed between the side trim panel and the support portion of the frame.

6. The vehicle seat assembly of claim 1, wherein the guide panel is made of sheet material.

7. A vehicle seat assembly comprising:
   a frame;
   a seat pad adjacent the frame;
   a trim cover extending over at least a part of the seat pad;
   an air bag assembly mounted on the frame, the air bag assembly including an inflator and a folded air bag that is inflatable by the inflator to unfold and project outwardly from the seat assembly, the air bag assembly being disposed between the frame and the seat pad such that the frame extends along the air bag assembly outboard of the air bag assembly;
   an optional air bag guide including a flexible panel associated with the air bag assembly; and
   a plastic back panel having a portion adjacent the trim cover, the back panel configured such that the air bag, when inflated, is capable of projecting between the back panel and the trim cover, and wherein the frame and the seat pad cooperate to form a space in which at least a majority of the air bag assembly is disposed, the frame being disposed between the air bag assembly and portion of the back panel adjacent the trim cover.

8. The vehicle seat assembly of claim 7, wherein the trim cover comprises a front trim panel and a side trim panel connected to each other to form a release seam, with the side trim panel being adjacent the frame such that the frame is disposed between the side trim panel and the air bag assembly.

9. The vehicle seat assembly of claim 8, wherein the seat pad comprises a main body portion capable of supporting an occupant and a minor body portion disposed between the side trim panel and the frame, the frame being disposed between the minor body portion of the seat pad and the air bag assembly.

10. The vehicle seat assembly of claim 7, wherein the flexible panel is present and is connected to the frame, the guide panel having two surfaces capable of cooperating to form a deployment chute for the air bag.

11. The vehicle seat assembly of claim 7, wherein the trim cover comprises a front trim panel and a side trim panel connected to each other to form a release seam, the flexible panel having a first end adjacent the air bag assembly and a second end connected to the release seam.

12. A method of making a vehicle seat assembly, said method comprising:
providing a frame having a rear portion having an inner end and an outer end and a forwardly extending support portion extending from the inner end of the rear portion, the second end not having a frame portion extending therefrom;
mounting a seat pad on the support portion of the frame such that an air bag assembly space is disposed between support portion of the frame and the seat pad, the air bag assembly space being 150 to 3,500 cm$^3$;
disposing a trim cover over at least a portion of the seat pad and the frame;
securing an air bag assembly to the support portion of the frame in the air bag assembly space such that the support portion of the frame is outboard of the air bag assembly, the air bag assembly including an air bag that is inflatable; and
providing an air bag guide including a panel of sheet material, and associating the air bag guide with the air bag assembly so the panel of sheet material extends between the seat pad and the air bag assembly.

13. The method of claim 12, further comprising providing a back panel having a portion adjacent the trim cover, the back panel configured such that the air bag, when inflated, is capable of projecting between the back panel and the trim cover.

14. The method of claim 12, wherein the trim cover comprises a front trim panel and a side trim panel connected to each other to form a release seam, with the side trim panel being adjacent the frame such that the support portion of the frame is disposed between the side trim panel and the air bag assembly, and wherein the seat pad comprises a main body portion capable of supporting an occupant and a minor body portion disposed between the side trim panel and the frame, the support portion of the frame being disposed between the minor body portion of the seat pad and the air bag assembly.

15. The method of claim 12, wherein the panel of sheet material has a first end adjacent the air bag assembly and a second end secured to the trim cover, and wherein the trim cover comprises a front trim panel and a side trim panel connected to each other to form a release seam, the second end of the panel being connected to the release seam.

16. The method of claim 12, wherein the frame is made of a composite material including fiber disposed in a resin matrix, and the frame comprises a bucket seat shell.

* * * * *

UNITED STATES PATENT AND TRADEMARK OFFICE
CERTIFICATE OF CORRECTION

| | |
|---|---|
| PATENT NO. | : 8,662,531 B2 |
| APPLICATION NO. | : 13/663693 |
| DATED | : March 4, 2014 |
| INVENTOR(S) | : Michael L. Tracht et al. |

It is certified that error appears in the above-identified patent and that said Letters Patent is hereby corrected as shown below:

In the Claims

Column 8, Line 12, Claim 1:
After "main body portion of the seat" delete "ad" and
Insert -- pad --.

Signed and Sealed this
Twenty-fourth Day of June, 2014

Michelle K. Lee
*Deputy Director of the United States Patent and Trademark Office*